US012563379B2

(12) United States Patent
Stridkvist et al.

(10) Patent No.: US 12,563,379 B2
(45) Date of Patent: Feb. 24, 2026

(54) DIGITAL RADIO COMMUNICATIONS

(71) Applicant: Nordic Semiconductor ASA, Trondheim (NO)

(72) Inventors: Johan Stridkvist, Trondheim (NO); Rubin Gerritsen, Trondheim (NO); Hans Elfberg, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 550 days.

(21) Appl. No.: 17/910,709

(22) PCT Filed: Mar. 11, 2021

(86) PCT No.: PCT/EP2021/056260
§ 371 (c)(1),
(2) Date: Sep. 9, 2022

(87) PCT Pub. No.: WO2021/180889
PCT Pub. Date: Sep. 16, 2021

(65) Prior Publication Data
US 2023/0171579 A1    Jun. 1, 2023

(30) Foreign Application Priority Data

Mar. 12, 2020    (GB) ...................................... 2003625

(51) Int. Cl.
*H04W 8/00*        (2009.01)
*H04W 28/18*       (2009.01)
*H04W 28/24*       (2009.01)

(52) U.S. Cl.
CPC ........... *H04W 8/005* (2013.01); *H04W 28/18* (2013.01); *H04W 28/24* (2013.01)

(58) Field of Classification Search
CPC ...... H04W 8/005; H04W 28/18; H04W 28/24
See application file for complete search history.

(56) References Cited

U.S. PATENT DOCUMENTS

2015/0201455 A1    7/2015   Redding et al.
2017/0026777 A1 *  1/2017   Denboer ........... H04W 72/0446
                   (Continued)

FOREIGN PATENT DOCUMENTS

EP              3672296 A1 *   6/2020
WO      WO 2018/088952 A1      5/2018
WO      WO 2018/236124 A1     12/2018

OTHER PUBLICATIONS

Bluetooth®, "Core System Package [Low Energy Controller volume]" Specification of the Bluetooth® System, Specification, vol. 6, published on Dec. 6, 2016, 263 pages.
(Continued)

*Primary Examiner* — Donald L Mills
(74) *Attorney, Agent, or Firm* — Klarquist Sparkman, LLP

(57) ABSTRACT

A method of digital radio communication between a central device and a peripheral device. The peripheral device transmits a repeated burst of advertising packets on a primary physical channel, each packet comprising an advertising field indicating an availability to form a connection. The advertising field comprises an address identifying the peripheral device. The peripheral device transmits a subsequent advertising packet on an auxiliary channel. The central device receives a packet from the burst of packets, decodes the advertising field and compares the address to one or more desired connection addresses to determine whether to initiate a connection to the peripheral device. If the address matches a desired connection address, the central device initiates a connection to the peripheral device. If the address does not match a desired connection address, the central device resumes listening for further advertising packets.

6 Claims, 6 Drawing Sheets

(56)  References Cited

U.S. PATENT DOCUMENTS

| | | | |
|---|---|---|---|
| 2017/0041868 A1* | 2/2017 | Palin | ................. H04W 52/0216 |
| 2017/0244576 A1 | 8/2017 | Batra et al. | |
| 2017/0303076 A1* | 10/2017 | Song | ....................... H04W 4/80 |
| 2018/0242130 A1 | 8/2018 | Ganton et al. | |
| 2020/0221383 A1 | 7/2020 | Jung et al. | |
| 2020/0314735 A1* | 10/2020 | Aijaz | .................... H04W 52/46 |
| 2021/0105603 A1* | 4/2021 | Meier | ............... H04W 52/0229 |

OTHER PUBLICATIONS

International Search Report and Written Opinion for PCT/EP2021/ 056260, mailed Jun. 7, 2021, 16 pages.
IPO Search Report under Section 17(5) for GB2003625.7, mailed Nov. 30, 2020, 3 pages.

* cited by examiner

DIGITAL RADIO COMMUNICATIONS

FIELD

This invention relates to short-range, ad hoc radio communication networks. Such networks, which include for example Bluetooth™, have many uses for transferring data between, and controlling, a whole variety of different devices.

BACKGROUND

Under the Bluetooth™ protocol, when two devices have been paired, they recognise each other and will try to connect when in range of each other. The connection process involves one of the devices, known as the peripheral device, transmitting a special format data packet, known as an advertising packet, on a number of different radio frequency (RF) channels in sequence. The advertising packet will be received by the other device, known as the master or central device, if it is in range and listening on the right channel at the time of transmission.

The advertising packet is transmitted on a primary physical channel and includes a pointer to an auxiliary physical channel on which is transmitted a further data packet from where the central device can determine the identity or address of the peripheral device. If the central device receives this primary channel packet it listens on the auxiliary channel so that it can determine whether the peripheral device sending the advertising message is one that it wishes to connect to (i.e. because it has been previously paired with it) and, if so, proceeds with the connection process (by transmitting a connection request). If it is not, the central device simply ignores the advertising message and reverts to scanning for advertising packets again—e.g. from a different peripheral device.

Once a peripheral device and central device have connected they may exchange data and other messages. However maintaining such a connection may be costly in terms of power consumption and thus it will be important in general that either device can enter into a low power sleep state in which the connection is broken.

When the device re-awakens, the procedure set out above will be followed again to establish reconnection. This will also happen if the devices move out of range of each other and then back again, or if there is local noise which causes the connection to break.

The Applicant has recognised however that the reconnection procedure set out above has some shortcomings. For example it can take a relatively long time to re-establish the connection because whilst the central device is going through the process of listening to the particular auxiliary channel indicated in the primary channel of an advertising packet—which may not even relate to a peripheral it wishes to connect to—the central device could miss an advertising packet from a device it does wish to connect to. This is exacerbated as the advertising packets transmitted on a given channel are necessarily relatively infrequent. This could give rise to typical reconnection delays well above 100 ms, which in many applications can impact a user's experience. The Applicant has also recognised that it gives rise to unnecessary power consumption by both the central and peripheral devices.

SUMMARY

The present invention aims at least partly to address the issues set out above and when viewed from a first aspect the invention provides a method of digital radio communication between a central device and a peripheral device comprising:

the peripheral device transmitting a repeated burst of advertising packets, each packet comprising an advertising field indicating an availability to form a connection, wherein said advertising field comprises an address identifying the peripheral device;

the central device receiving a packet from said burst of packets, decoding said advertising field and comparing said address to one or more desired connection addresses to determine whether to initiate a connection to the peripheral device;

if said address matches a desired connection address, the central device initiating a connection to said peripheral device; and if said address does not match a desired connection address, the central device resuming listening for further advertising packets.

The invention extends to a digital radio communication system comprising a central device and a peripheral device arranged to operate according to a predetermined communication protocol, wherein:

the peripheral device is arranged to transmit a repeated burst of advertising packets, each packet comprising an advertising field indicating an availability to form a connection, wherein said advertising field comprises an address identifying the peripheral device;

the central device is arranged to receive a packet from said burst of packets and decodes said advertising field and comparing said address to one or more desired connection addresses to determine whether to initiate a connection to the peripheral device;

if said address matches a desired connection address, the central device is arranged to initiate a connection to said peripheral device; and if said address does not match a desired connection address, the central device is arranged to resume listening for further advertising packets.

The invention also extends to a central digital radio communication device arranged to operate according to a predetermined communication protocol, wherein said device is arranged to:

receive a packet from a repeated burst of advertising packets transmitted by a peripheral digital radio communication device, each packet comprising an advertising field indicating an availability to form a connection, wherein said advertising field comprises an address identifying the peripheral device;

decode said advertising field and compare said address to one or more desired connection address to determine whether to initiate a connection to the peripheral device;

if said address matches a desired connection address, initiate a connection to said peripheral device; and if said address does not match a desired connection address, resume listening for further advertising packets.

The invention also extends to a peripheral digital radio communication device arranged to operate according to a predetermined communication protocol, wherein said device is arranged to:

transmit a repeated burst of advertising packets, each packet comprising an advertising field indicating an availability to form a connection, wherein said advertising field comprises an address identifying the device.

The invention also extends to a method of operating a central digital radio communication device comprising:

receiving a packet from a repeated burst of advertising packets transmitted by a peripheral digital radio communication device, each packet comprising an advertising field indicating an availability to form a connection, wherein said advertising field comprises an address identifying the peripheral device;

decoding said advertising field and comparing said address to one or more desired connection address to determine whether to initiate a connection to the peripheral device;

if said address matches a desired connection address, initiating a connection to said peripheral device; and if said address does not match a desired connection address, resuming listening for further advertising packets.

The invention also extends to a non-transitory computer readable medium comprising instructions configured to cause a central digital radio communication device to operate in accordance with the method set out above.

The invention also extends to a method of operating a peripheral digital radio communication device comprising:

transmitting a repeated burst of advertising packets, each packet comprising an advertising field indicating an availability to form a connection, wherein said advertising field comprises an address identifying the device;.

The invention also extends to a non-transitory computer readable medium comprising instructions configured to cause a peripheral digital radio communication device to operate in accordance with the method set out above.

Thus it will be seen by those skilled in the art that in accordance with the invention the advertising packet includes an address of the peripheral device in the advertising field. This enables the central device to initiate a connection to the peripheral faster if the central device wishes to connect to that peripheral (e.g. because they have been paired or were previously connected) because it can determine the identity of the peripheral directly from the advertising field. On the other hand if the peripheral is not one that the central device wishes to connect to, the central device does not need to tie up its radio resources listening to the auxiliary channel and so can resume listening for advertising packets from other peripherals (which it may want to connect to) more quickly which will reduce the average time taken to connect to desired peripherals.

Moreover the transmission of a burst of advertising packets also increases the probability that the central device is listening on the right channel when one of them is transmitted which on average reduces the time taken to re-connect.

As will be appreciated by those skilled in the art, embodiments of the present invention allow a saving in power at both sides of the communication because the central device is required to decode fewer transmissions on average and because both devices can be put in low power mode (e.g. sleep) more readily—and so break the connection—without this having too much of a detrimental effect on user experience as a result of latency associated with the consequent reconnections.

In a set of embodiments the peripheral device is arranged to transmit each advertising packet on a primary physical channel and to transmit a subsequent advertising packet on an auxiliary channel. Similarly in a set of embodiments the central device receives the packet from the repeated burst of advertising packets transmitted by the peripheral device on a primary physical channel and initiating the connection comprises the central device receiving and decoding a subsequent advertising packet transmitted by the peripheral device on an auxiliary channel.

The central device may then listen to the auxiliary channel in order to receive the subsequent packet only if the advertising packet contains an address of a peripheral device it wishes to connect to. The subsequent packet may, for example, contain further information regarding the peripheral device or parameters regarding the connection it wishes to make, allowing the central device to initiate a connection to the peripheral device over the auxiliary channel.

In a set of embodiments of any aspect of the invention the central device initiating a connection comprises the central device receiving and decoding the subsequent advertising packet. The central device initiating a connection may comprise the central device transmitting a connection request packet over the auxiliary channel after receiving the subsequent advertising packet. This connection request packet is then received and decoded by the peripheral device. The peripheral device then transmits a connect response packet over the auxiliary channel which is received and decoded by the central device, after which a connection between the central and peripheral device is established.

The peripheral device could transmit said burst of advertising packets over a single channel. However in a set of embodiments the peripheral device transmits said burst of advertising packets over a plurality of channels, e.g. in a cycle. The sequence of channels over which the packet bursts are transmitted may be repeated a number of times, increasing the probability that the central device is listening on the right channel when one of the packets is transmitted which on average reduces the time taken to re-connect.

In a set of embodiments the peripheral device transmits said burst of advertising packets at a data rate greater than 1 Mbps e.g. at 2 Mbps. This may increase rate of advertising packets being transmitted by said peripheral device, increasing the probability that the central device is listening on the right channel when one of the packets is transmitted which on average reduces the time taken to re-connect.

BRIEF DESCRIPTION OF THE DRAWINGS

An embodiment of the invention will now be described, by way of example only, with reference to the accompanying drawings in which.

DETAILED DESCRIPTION OF THE DRAWINGS

Figure 1:
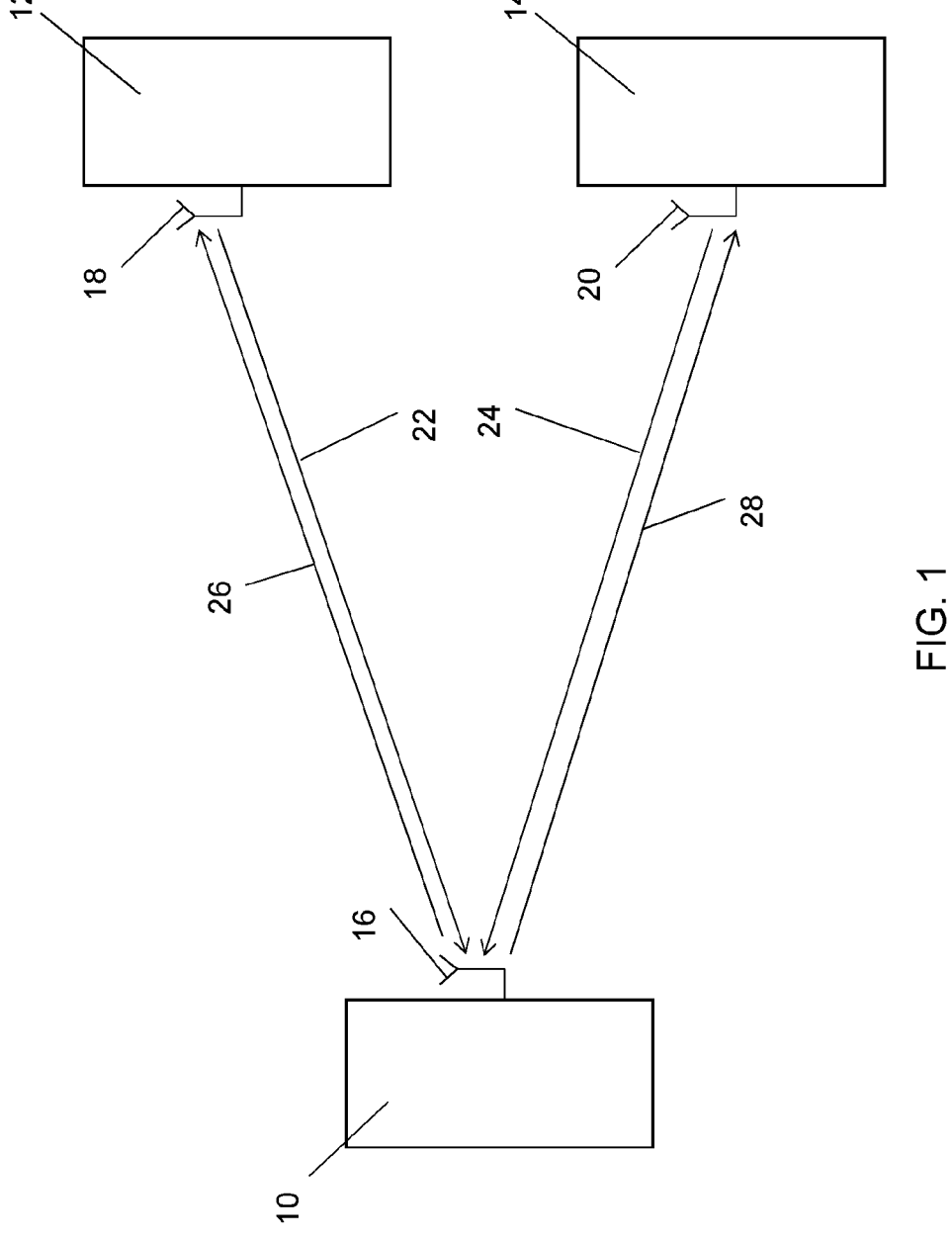
FIG. 1 is a schematic diagram illustrating a typical radio communication system.

FIG. 1 shows a radio system comprising a first central, or initiator, transceiver device 10, a first peripheral radio transceiver device 12 and a second peripheral radio transceiver device 14. Hereafter, these will be referred to as the central device 10, first peripheral 12 and second peripheral 14. The central device 10 comprises an antenna 16; the first peripheral 12 comprises an antenna 18; and the second peripheral comprises an antenna 20. As will be well understood by those skilled in the art, a number of standard modules such as processors, oscillators, filters, amplifiers, digital to analogue converters (DACs) and analogue to digital converters (ADCs) are provided in the radio transceivers 10, 12 and 14 but the description of these is omitted for the sake of brevity.

FIG. 1 also shows the signal paths 22, 24, 26 and 28. Signal paths 22 and 24 are from the peripherals 12 and 14 respectively when acting as transmitters through their respective antennas 18 and 20 to the central device 10 when acting as a receiver through its antenna 16. Signal paths 26 and 28 are from the central device 10, acting as a transmitter through its antenna 16 to the peripherals 12 and 14 respectively, acting as receivers through their respective antennas 18 and 20. The transceivers 10, 12 and 14 may be configured to operate using OFDM (Orthogonal Frequency Division Multiplexing) as is known per se in the art.

FIGS. 2a and 2b illustrate examples of prior art transmission/reception sequences 29a, 29b, 30a, 30b used in Bluetooth™ Low Energy (BTLE) Extended Advertising for a central radio transceiver 10 and a peripheral radio transceiver 12 respectively. Sequences 29a, 29b illustrate the actions of the central device 10 and sequences 30a, 30b illustrate the actions of the peripheral device 10.

In order to initiate a connection between the central device 10 and a peripheral 12, the peripheral 12 transmits advertising packets 31, 32, 34 on different physical channels A, B and C respectively. It will be understood by one skilled in the art that the number of physical channels is not limited to three: advertising packets may be transmitted over any number of physical channels by the peripheral 12. Each advertising packet includes a pointer to an auxiliary physical channel on which a further auxiliary advertising packet 36 is transmitted by the peripheral 12 from which the central device 10 can determine the address of the peripheral device 12.

FIG. 2a illustrates an example of a situation where a successful connection is formed between the central device 10 and the peripheral 12 using BTLE. The central device 10 cyclically listens on different physical channels until it receives an advertising packet: it may only receive advertising packets transmitted over the physical channel corresponding to the designated reception slot, and a packet will not be received during slots 41a wherein the central device 10 is busy (e.g. serving as a master for a different connection). Hereafter, a solid arrow 50 indicates that a packet is transmitted and received; a dotted arrow 52 indicates that a packet is transmitted but not received; and no arrow indicates that a packet is not transmitted.

In this example therefore, the central device does not receive the advertising packet transmitted on channel A because it is busy in the corresponding slot 41a. However it does receive the advertising packet 32a, transmitted over channel B, in the next reception slot 44a. This packet contains a pointer to the auxiliary channel over which the auxiliary advertising packet 36a is transmitted. The central device 10 then waits and listens on the auxiliary channel during the corresponding reception slot 48a. The third advertising packet 34a is also not received as the central device is busy in corresponding slot 43a.

As it is listening to the Aux channel in the appropriate slot 48a, the central device receives the auxiliary advertising packet 36a transmitted by the peripheral, from which the central device 10 is able to determine the address of the peripheral 12 and determine whether a connection should be initiated.

If the address of the peripheral 12 indicates that no connection should be initiated, the central device 10 stops all activities on the auxiliary channel and reverts to listening on the primary channels. In this example, however, the central device 10 determines that a connection should be initiated, so the central device 10 transmits a connect request packet 38a to the peripheral 12 over the auxiliary channel. The peripheral 12 then transmits a connect response packet 40a to the central device 10 over the auxiliary channel, after which a connection between central device 10 and peripheral 12 has been successfully established.

FIG. 2b illustrates an example situation where no connection is formed between the central device 10 and the peripheral 12 as a result of asynchronisation between the transmission slots of the advertising packets 31b, 32b and 34b of the peripheral 12 and the reception slots for each channel 42b, 44b and 46b of central device 10. As before, the advertising packet 31b sent over channel A is not received as the central device is busy in corresponding slot 41b. However the next advertising packet 32b sent over channel B is also not received as the central device is listening on channel A in the corresponding slot 42b. The third advertising packet 34b sent over channel C is also not received as the central device is busy again in slot 43b. An auxiliary advertising packet 36b is transmitted by the peripheral on the Aux channel as before but the central device does not receive this as it is listening in slot 44b to channel B.

As a result of this, no connection is formed between the transceivers 10 and 12 within this scanning event, resulting in an extended time required to initiate a connection as multiple scanning events are required.

Figure 3:
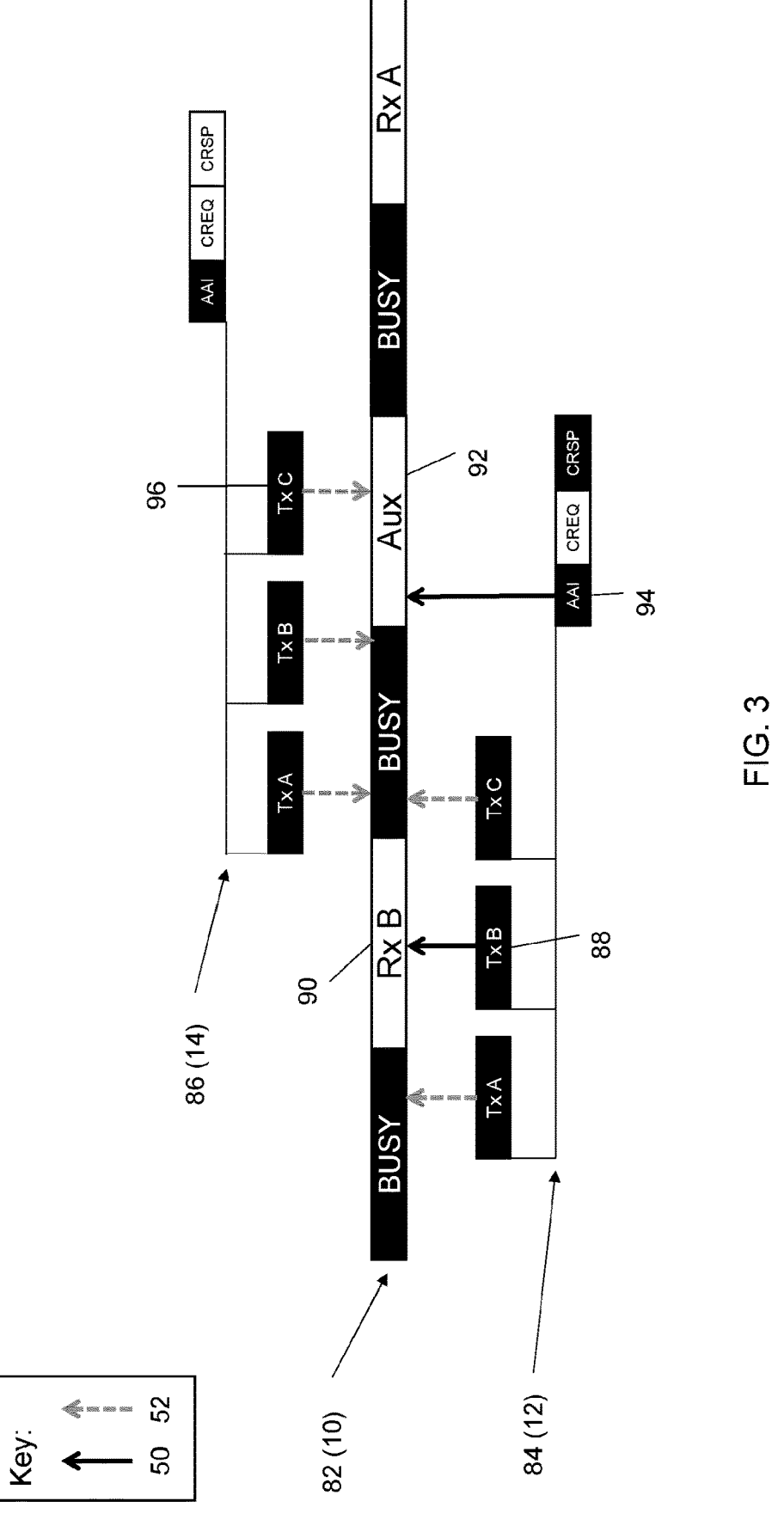
FIG. 3 is a schematic diagram further illustrating transmission/reception sequences used in BTLE.

FIG. 3 illustrates further example transmission/reception sequences 82, 84 and 86 from the perspective of the central device 10, first peripheral 12 and second peripheral 14 respectively. In this example, the central device 10 receives an advertising packet 88, transmitted by the first peripheral radio transceiver 12 over physical channel B, within a reception slot 90 in which it was listening to channel B. As a result of this, the central device then listens on the auxiliary channel in reception slot 92 and thus receives and decodes the auxiliary advertising packet 94 transmitted by the first peripheral 12. In this example, the address contained within the auxiliary advertising packet 94 indicates to the central device 10 that the first peripheral 12 is not one with which the central device 12 has paired and thus no attempt to connect to the first peripheral 12 is required. However, while the central device is listening on the Aux channel in reception slot 92, it does not receive the advertising packet 96 transmitted by the second peripheral 14 over channel C. This would not have been the case had the central device 10 not been required to follow the pointer to the auxiliary channel of the first peripheral 12 in this reception slot—instead the reception slot 92 would have been used for C-channel reception and packet 96 would have been received by the central device. This situation further extends the average time taken to establish a reconnection.

Figure 4:
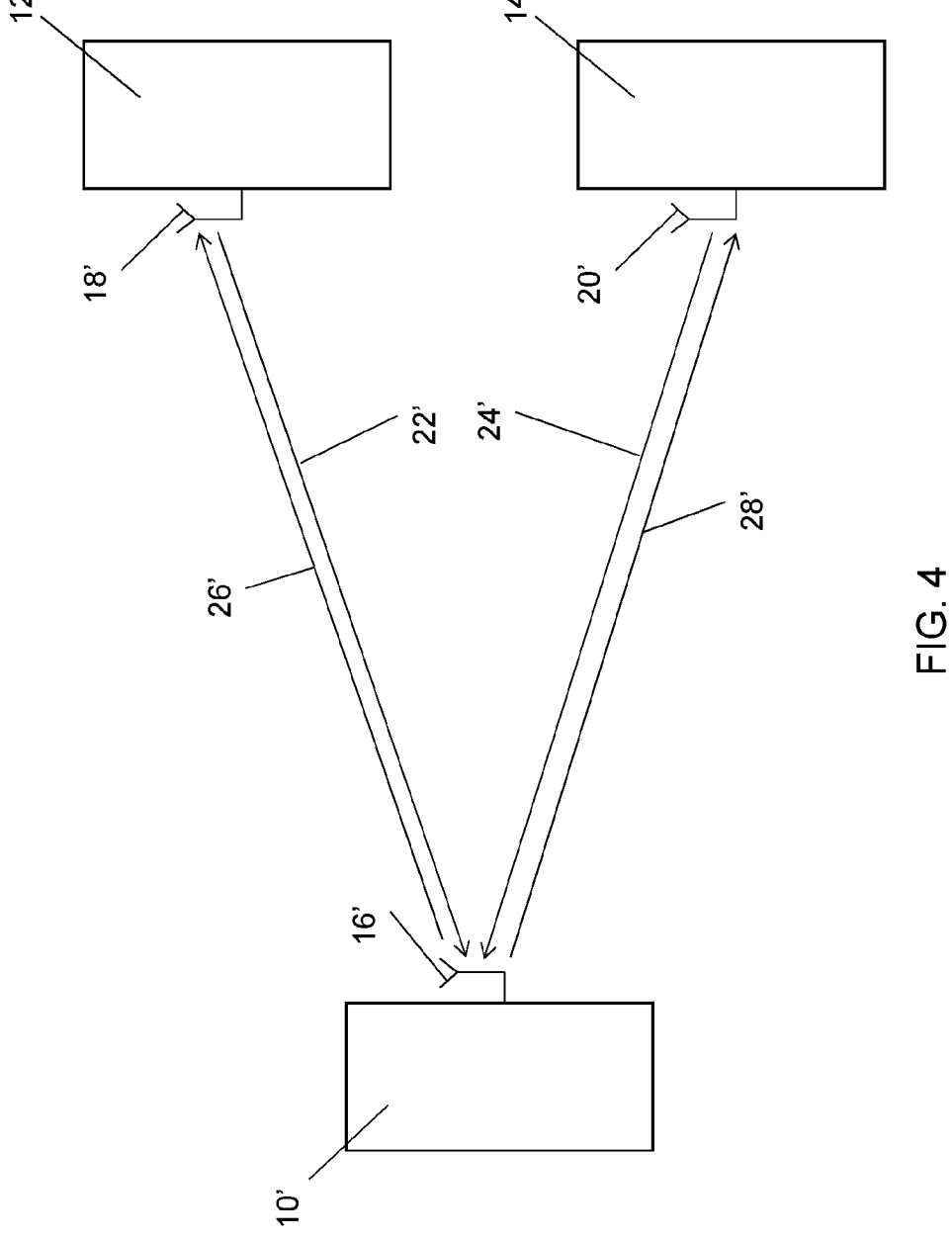
FIG. 4 is a schematic diagram illustrating a radio communication system in accordance with an embodiment of the invention.

FIG. 4 illustrates a further radio system in accordance with an embodiment if the present invention. As may be deduced by the similar reference numerals (except for the addition of a prime character) this may employ similar hardware to the BTLE system of FIG. 1 but is arranged to operate differently as will be described below with reference to FIGS. 5 and 6.

Figure 5:
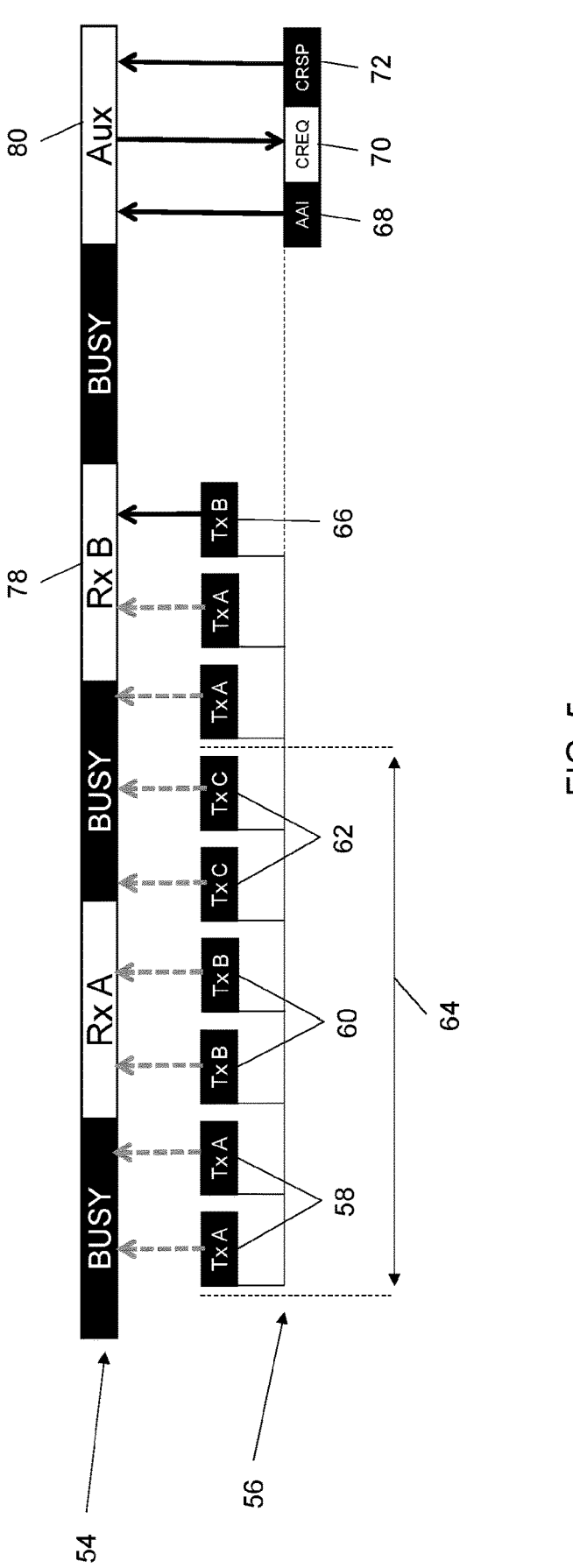
FIG. 5 is a schematic diagram illustrating transmission/reception sequences in accordance with an embodiment of the present invention.

FIG. 5 illustrates example transmission/reception sequences 54 and 56 for the system of FIG. 4 with sequence 54 illustrating the actions of the central device 10' and sequence 56 illustrating the actions of the first peripheral device 12'.

As may be seen in sequence 56, unlike in BTLE, each advertising packet 58, 60, 62 is transmitted two times each over each channel A, B, C, and each channel sequence 64 is repeated several times. In addition to this, each advertising packet 58, 60 and 62 contains the address of peripheral radio transceiver 12'. For the sake of brevity only one full channel sequence 64 is shown, however it will be understood by one skilled in the art that this may be repeated any number of times. It will also be understood that the number of times each packet is transmitted is not limited to two: any number of repetitions may be used.

Figure 2:
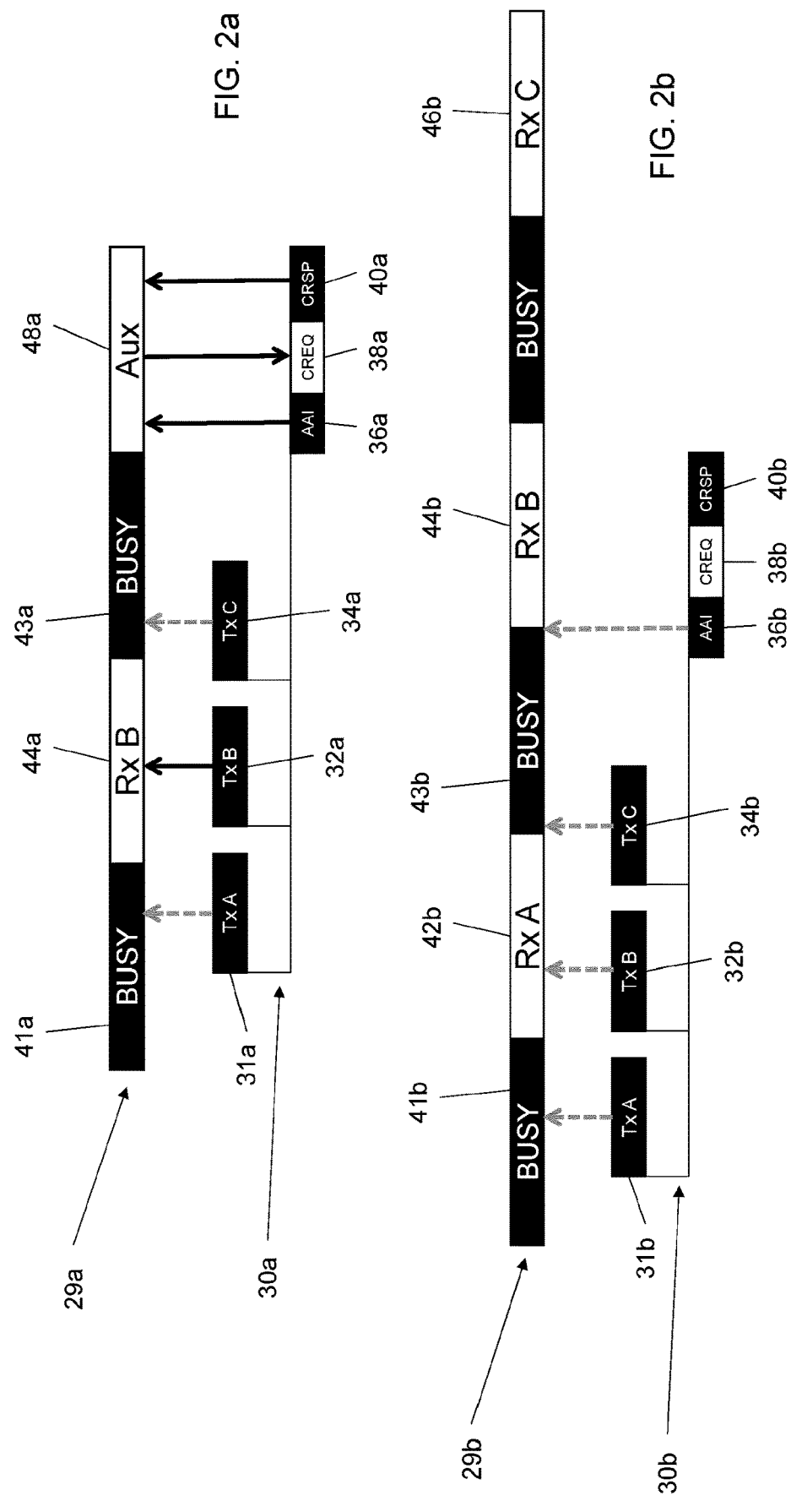
FIGS. 2a and 2b are schematic diagrams illustrating prior art transmission/reception sequences used in Bluetooth™ Low Energy (BTLE) Extended Advertising.

Also in contrast to BTLE, the advertising packets 58, 60, 62 are transmitted at 2 Mbps rather than 1 Mbps as indicated by the shorter packet durations compared to those of FIGS. 2 and 3.

As a result of the differences described above, although all the advertising packets 58, 60, 62 in the first sequence 64 are not received, either because the central device 10' is busy or listening on the wrong channel, the advertising packet 66 transmitted over channel B in the second sequence is received by the central device in reception slot 78. Compared to the situation in FIGS. 2*a* and 3, this is a relatively short time.

The central device 10' decodes the advertising packet 66 including the address contained in the package data unit (PDU) thereof. It compares this address to those it has stored in a database to determine whether it wishes to connect to the peripheral 12'—e.g. because it has already been paired with it. This allows the central device 10' to determine straightaway that the packet is from a peripheral 12' that it wishes to connect to and that it should thus initiate connection. The central device 10' then listens on the auxiliary channel in the appropriate slot 80 and receives and decodes the auxiliary advertising packet 68 transmitted by the peripheral 12'. As in BTLE the central device 10' then transmits a connect request packet 70 to the peripheral 12' over the auxiliary channel. The peripheral 12' then transmits a connect response packet 72 to the central device 10' over the auxiliary channel, after which a connection between the central device 10' and peripheral 12' has been successfully established.

If, however, the central device 10' had not wished to connect to the peripheral 12', it could avoid listening to the Aux channel in slot 80 and listen instead to the next primary channel (e.g. channel C), which increases the likelihood of the central device 10' receiving an advertising packet from another peripheral 14' which it might want to connect to. This is shown in more detail in FIG. 6.

Figure 6:
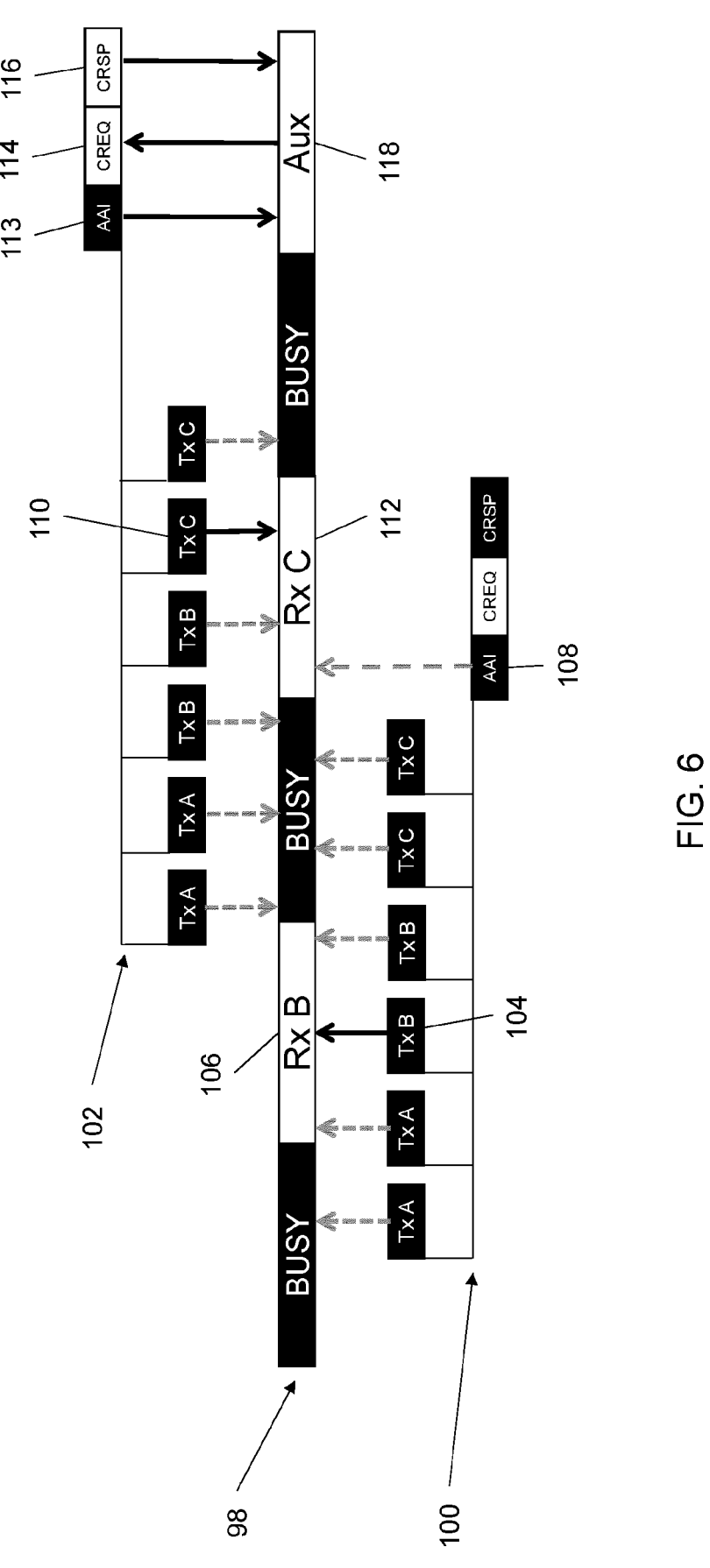
FIG. 6 is a schematic diagram illustrating further transmission/reception sequences in accordance with embodiments of the present invention.

FIG. 6 illustrates further example transmission/reception sequences 98, 100 and 102 for the central device 10', first peripheral device 12' and second peripheral device 14' respectively. In this situation, the central device 10' receives an advertising packet 104 transmitted by the first peripheral 12' over channel B in reception slot 106 as it was listing on that channel at that time. The central device 10' then decodes the packet 104 and compares the address of the peripheral 12' which is provided in the PDU of the packet to a list of peripherals with which it is paired.

In this example, the central device 10' does not wish to initiate a connection to the first peripheral 12'; again the central device is able to determine that this is the case just from the data contained within advertising packet 104, as the address of peripheral 12' is contained within its PDU. As a result, the central device 10' is not required to follow the auxiliary pointer for the first peripheral 12' in the subsequent reception slot 112—instead the central device continues listening on the next primary channel (channel C in this example) in reception slot 112. Thus, the auxiliary advertising packet 108 transmitted by the first peripheral 12' is not received by the central device 10'.

As a result of this, central device 10' is able to receive the advertising packet 110 transmitted by the second peripheral 14' over physical channel C, in reception slot 112. Also contained in packet 110 is the address of the second peripheral 14'; the central device 10' compares this address to its list and determines that it wishes to initiate a connection to the second peripheral 14' from this address. Thus, the central device 10' then follows the auxiliary pointer of the second peripheral 14', listens on its auxiliary channel and receives the auxiliary advertising packet 113 transmitted by second peripheral 14'. As before the central device 10' then transmits a connect request packet 114 to the second peripheral 14' over the auxiliary channel. The second peripheral 14' then transmits a connect response packet 116 to the central device 10' over the auxiliary channel, after which a connection between the central device 10' and the second peripheral 14' has been successfully established.

This example demonstrates the advantage of containing an advertiser's address within primary channel advertising packets: a shortened time is required to initiate a connection between the central device 10' and the second peripheral 14'. Had packet 104 not contained the address of the first peripheral 12', the central device 10' would have followed the auxiliary pointer of the first peripheral 12' despite not being required to initiate a connection, preventing the central device from receiving advertising packet 110 from the second peripheral 14' and initiating the desired connection.

It will be appreciated by those skilled in the art that the example given above is just one way that the invention may be implemented and that many modifications and variants are possible within the scope of the invention.

The invention claimed is:

1. A method of digital radio communication between a central device and a peripheral device comprising:

the peripheral device transmitting repeated bursts of advertising packets over a sequence of primary physical channels, each packet comprising an advertising field indicating an availability to form a connection, wherein said advertising field comprises an address identifying the peripheral device and said sequence is repeated a number of times;

the peripheral device transmitting a subsequent advertising packet on an auxiliary channel;

the central device receiving a packet from said bursts of packets, decoding said advertising field and comparing said address to one or more previously stored connection addresses to determine whether to initiate a connection to the peripheral device;

when said address matches a previously stored connection address, the central device initiating a connection to said peripheral device, wherein initiating the connection comprises the central device receiving and decoding the subsequent advertising packet; and when said address does not match a previously stored connection address, the central device resuming listening for further advertising packets.

2. The method as claimed in claim 1, wherein the subsequent advertising packet contains further information regarding the peripheral device or parameters regarding the connection the peripheral device wishes to make in order to allow the central device to initiate the connection to the peripheral device.

3. The method as claimed in claim 1, wherein the central device initiating a connection comprises:

the central device transmitting a connection request packet over the auxiliary channel;

the peripheral device receiving and decoding said connection request packet;

the peripheral device transmitting a connect response packet over the auxiliary channel; and the central device receiving and decoding said connect response packet, establishing a connection between the central device and the peripheral device.

4. The method as claimed in claim 1, wherein the peripheral device transmits bursts of advertising packets at a data rate greater than 1 Mbps.

5. A central digital radio communication device arranged to operate according to a predetermined communication protocol, wherein the central digital radio communication device is arranged to:

receive a packet from repeated bursts of advertising packets transmitted over a sequence of primary physical channels by a peripheral digital radio communication device, wherein said sequence is repeated a number of times, each packet comprising an advertising field indicating an availability to form a connection, wherein said advertising field comprises an address identifying the peripheral digital radio communication device;

decode said advertising field and compare said address to one or more previously stored connection address to determine whether to initiate a connection to the peripheral digital radio communication device;

when said address matches a previously stored connection address, initiate a connection to said peripheral digital radio communication device, wherein initiating the connection comprises the central device receiving and decoding a subsequent advertising packet transmitted by the peripheral digital radio communication device on an auxiliary channel; and when said address does not match a previously stored connection address, resume listening for further advertising packets.

6. The central digital radio communication device as claimed in claim 5, wherein initiating the connection comprises the central digital radio communication device:

transmitting a connection request packet over the auxiliary channel; and receiving and decoding a connect response packet transmitted over the auxiliary channel by the peripheral digital radio communication device, establishing a connection between the central digital radio communication device and the peripheral digital radio communication device.

\* \* \* \* \*